July 16, 1940.　　　C. M. BOLSTER　　　2,207,713
GASOLINE DUMPING DEVICE
Filed May 20, 1939　　　2 Sheets-Sheet 1

INVENTOR
CALVIN M. BOLSTER
BY
ATTORNEY

July 16, 1940.  C. M. BOLSTER  2,207,713
GASOLINE DUMPING DEVICE
Filed May 20, 1939  2 Sheets-Sheet 2
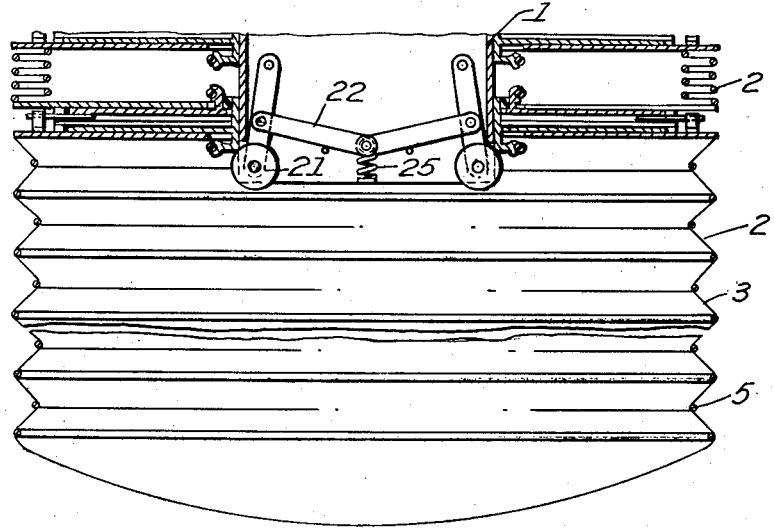
Fig. 3
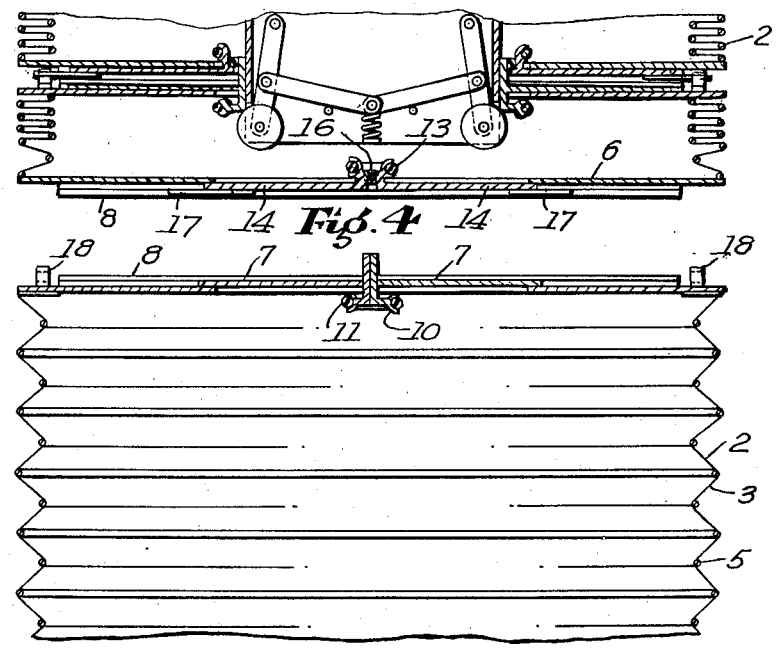
Fig. 4
Fig. 5
INVENTOR
CALVIN M. BOLSTER
BY
Ransom K. Davis
ATTORNEY Patented July 16, 1940

2,207,713

UNITED STATES PATENT OFFICE 2,207,713

GASOLINE DUMPING DEVICE

Calvin M. Bolster, United States Navy

Application May 20, 1939, Serial No. 274,735

13 Claims. (Cl. 244—135)

(Granted under the act of March 3, 1883, as amended April 30, 1928; 370 O. G. 757)

This invention relates to a means for dumping gasoline from the fuel tanks of an aircraft while in flight.

It frequently occurs in the flight of an aircraft that an emergency arises in which the continued flight of the craft or the prevention of a disastrous fire or explosion therein requires the quick dumping of the gasoline in its fuel tanks. However, this operation in itself, as previously carried out, is extremely hazardous to the craft and its occupants. Many major aircraft disasters have been attributed to fire or explosion caused by the discharge of an electrostatic charge accumulated on the craft along a stream of gasoline being discharged therefrom. Furthermore, the provision of an open body of gasoline adjacent the aircraft in the presence of any fire which might be in progress, or even in the presence of running motors, is extremely hazardous.

It is an object of this invention to eliminate the hazards attending the emergency dumping of gasoline from an aircraft.

It is a further object of this invention to provide a simple, inexpensive dumping means which will not appreciably add to the weight of an aircraft and will not require the use of a complicated and cumbersome mechanism for its operation.

Other objects of the invention will become apparent from a consideration of the following description of a preferred embodiment of my invention and the accompanying drawings, in which:

Fig. 3 is a longitudinal sectional view of the arrangement shown in Fig. 1 with the first bag of the device partially opened;

Fig. 4 is a similar view showing a bag other than the first partially opened; and, Fig. 5 is a longitudinal sectional view of the upper portion of a bag which has been filled and released from the dumping device.

Figure 1:
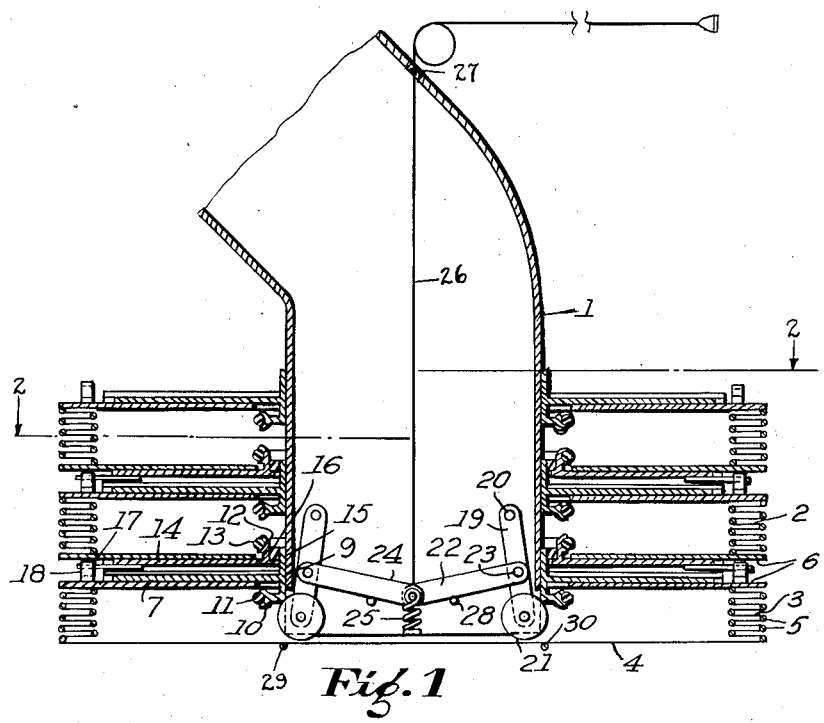
Fig. 1 is a longitudinal sectional view of a portion of the fuel discharge pipe of an aircraft and the dumping device.
Figure 2:
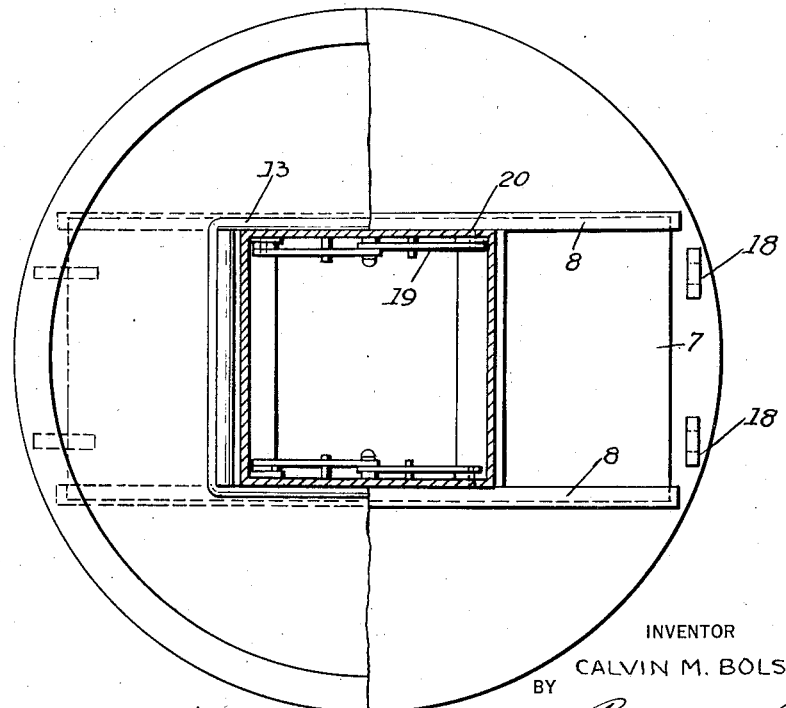
Fig. 2 is a cross-sectional view of the discharge pipe and dumping device, as shown in Fig. 1, taken along the line 2—2 of that figure.

Referring to Fig. 1, the bottom end of the fuel discharge pipe I of an aircraft is shown. This pipe is square in cross-section as may be seen in Fig. 2. Slidably fitting over the end of this pipe are a number of bags 2 having collapsible fabric side walls 3. The lower end 4 of the first bag may also be of fabric. The bags are provided with a series of wire rings 5 which cause the walls of the bag, when collapsed, to fold in an accordian manner.

The upper end wall 6 of the first bag and both end walls of the remaining bags are of metal and are provided with holes substantially larger than the cross-section of the discharge pipe. These walls are provided with gate valves adapted to close the holes therein. Each gate valve consists of two sliding plates, those of the valves closing the upper ends of the bags being numbered 7, 10 and those of the valves closing the lower ends of the bags being numbered 14, which move in slide-ways formed by inwardly flanged cleats 8 secured to the end wall of the bag and better shown in Fig. 2. The plates of the valves which close the lower ends of the bags are provided on their inner or adjacent ends with T-shaped flanges 9, the lower branches of which are turned outwardly as at 10 and are formed with a channel which carries an endless elastic band 11. The band 11 extends around the portion 10 of both plates of the gate valve and tends to draw them together into abutting relationship. Each of the plates of the valves which close the upper ends of the bags is formed at its inner end with a single upturned flange 12 provided with a channel which carries an elastic band 13 having the same function as the bands 11. The upper arm 15 of each of the plates 7 extends upwardly behind the flange 12 of the adjacent plate 14. Secured to the flange 12 and lying between it and the arm 15 is a resilient member 16. The pair of members 16 of one valve form a tight joint between the inner ends of plates 14 when the valve is closed.

Each of the plates 14 carries near its outer end a pair of rods 17 which pass through holes in lugs 18 secured to the upper metal end wall of the bag below which the bags are assembled on the end of the discharge pipe, and this arrangement serves to lock adjacent bags together while they are so assembled.

Inside the end of the discharge pipe are located two pairs of arms 19 pivotally attached at their upper ends to the side walls of the pipe at 20. At the lower ends of the arms are attached rollers 21 which normally partially extend through slots cut in the end of the pipe. Between each pair of arms attached to the same wall of the pipe is arranged a toggle-joint composed of two arms 22, which are pivotally attached to centrally located points 23 of the arms 19. Each pair of toggle arms 22 is pivotally joined at 24, at which point is also secured one end of a tension spring 25, the other end of which is secured to the discharge pipe. The pins 28 limit the downward movement of the arms 22. Leading from the pin of the joint 24 is a cord or wire 26. This wire leads through a packed hole in the discharge pipe and is led to a handle located within easy reach of the pilot or other operator. The discharge pipe leads to a fuel dump valve of conventional type in the bottom of the fuel tank. This structure, being conventional, is not shown. The lowermost bag may be held in collapsed condition when not in use by means of frangible cords 29, 30.

The operation of the device is as follows:

The fuel dump valve is first opened, admitting gasoline into the discharge pipe. As the first bag fills it opens out to full size. The bag is held by its top portion by the action of the rollers and the toggle-joint in the pipe. It will be noted that the rollers have a portion of their peripheries extending outside the pipe and preventing downward movement of the plates 7. The toggle-joint is maintained in its illustrated position by the action of spring 25. The arms 22 normally have an angular relation with the upper ends of arms 19 in excess of 90 degrees so that pressure by the plates 7 upon the rollers tends to increase the locking action of the toggle-joint in preventing inward movement of the rollers.

However, as the bottom bag becomes full, the weight causes the elastic bands 11 to stretch, allowing the plates 7 to move outwardly and ride over the rollers. Once past the rollers the plates 7 are drawn together, closing the top of the lower bag. The lower end of the second bag has been drawn down past the rollers by the movement of the upper end of the lower bag and as plates 7 snap together underneath the pipe, the plates 16 do likewise and the pins 17 are withdrawn from the lugs 18, releasing the lower bag which falls away. The lower end of the second bag is now closed. As this bag fills the sequence of operation is repeated until the last bag is reached.

Normally, more capacity is provided in the bags than necessary to hold the full supply of fuel. The last bag being only partially filled will not be heavy enough to stretch the elastic band 11 on its upper gate valve so that it may fall away, since the strength of these bands is so selected as to require the weight of a full bag to stretch them. When this occurs the pilot may pull on the wire 26 and thus break the toggle-joint and draw the rollers inwardly of the discharge pipe, thus allowing the last bag to fall away.

If each bag is made 17 inches in diameter and 4 feet in length when extended, it will hold about 50 gallons of gasoline. Such a bag will have a length of about 2 inches when collapsed. A battery of ten would hold 500 gallons, which should be ample for one outlet. The size and number of bags in a battery may of course be varied as desired.

It is believed that this invention, eliminating as it does the necessity of exposing an open body of gasoline in the vicinity of the aircraft, will materially contribute to the safety of air travel.

While I have described a preferred form of my invention, it is to be understood that the invention is not to be restricted thereby, but is to be construed as broadly as the scope and limitations of the accompanying claims will allow.

The invention described herein may be manufactured and/or used by or for the Government of the United States of America for governmental purposes without the payment of any royalties thereon or therefor.

What is claimed is:

1. In an aircraft, a fuel dumping means comprising a collapsible tubular means normally held in a collapsed state, means forming a part of said tubular means and dividing it into a series of connected sections, means to fill said sections in succession with fuel and means for closing each of said sections and releasing it from the aircraft when it becomes full.

2. In an aircraft having a fuel discharge pipe leading from a fuel tank thereof and a fuel dump valve in said pipe, a series of collapsible fuel containers connected together in end to end relation and normally telescoped over the end of said pipe in a collapsed condition, means normally restraining each container from removal from said pipe, said restraining means being so constructed and arranged as to be overcome by the weight of a container filled with fuel and thereby to release said container from the pipe, and means to close each container as it leaves the pipe.

3. In an aircraft having a fuel discharge pipe leading from a fuel tank thereof and a fuel dump valve in said pipe, a series of collapsible fuel containers connected together in end to end relation and normally telescoped over the end of said pipe in a collapsed condition, the lower end of the lowermost of said containers being normally closed and fitting over the end of said pipe in a cap-like manner, every other end of said containers being provided with a gate valve which opens to allow sliding passage of said pipe therethrough, means constantly urging each of said gate valves to closed position, means restraining each of said valves from passage downwardly over the end of said pipe, each of said valve urging means being so constructed and arranged as to yield and allow passage of its gate valve over the end of said pipe when acted on by the weight of a container filled with fuel, and to close its gate valve as soon as it has cleared the end of said pipe, and means operated by the closing of the gate valves on the adjacent ends of two adjacent containers to disconnect said containers and thereby allow the lowermost of said containers to fall free of the aircraft.

4. In combination with an aircraft having a fuel discharge pipe leading from a fuel tank thereof and a fuel dump valve in said pipe, a series of collapsible fuel containers connected together in end to end relation and normally telescoped over the end of said pipe in a collapsed condition, means normally restraining each of said containers from removal from said pipe, said restraining means being so constructed and arranged as to be overcome by the weight of a container filled with fuel and thereby to release said container from said pipe, and means to close each container as it leaves the pipe.

5. Fuel dumping means for use in an aircraft comprising a collapsible container normally stowed in a collapsed condition in said aircraft, means for filling said container with fuel from the aircraft and means operated by the characteristics of said container when filled to close and release it from said aircraft.

6. In an aircraft having a fuel discharge pipe leading from a fuel tank thereof and a fuel dump valve in said pipe, a series of collapsible fuel containers connected together in end to end relation and normally telescoped over the end of said pipe in a collapsed condition, the lower end of the lowermost of said containers being normally closed and fitting over the end of said pipe in a cap-like manner, every other end of said containers being provided with a gate valve which opens to allow sliding passage of said pipe therethrough, means constantly urging each of said gate valves to closed position, means on the end of said pipe restraining each of said valves from passage downwardly thereover, each of said valve urging means being so constructed and arranged as to yield and allow passage of its gate valve over said restraining means when acted on by the weight of a filled container and to close its gate as soon as it has cleared the end of said pipe, means operable to withdraw said restraining means at the will of an operator to allow downward movement thereover of a partially filled bag and means operable by the closing of the gate valves on the adjacent ends of two adjacent containers to disconnect said containers and thereby allow the lowermost thereof to fall free of the aircraft.

7. In an aircraft having a fuel discharge pipe leading from the fuel tank thereof and a valve for dumping fuel therefrom, a series of collapsed containers telescoped over the end of said pipe and so arranged that upon the opening of said valve the collapsed containers will in succession be filled with fuel and will thereupon fall clear of said aircraft.

8. In an aircraft having a fuel discharge pipe leading from a fuel tank thereof and a fuel dump valve in said pipe, a series of separate fuel containers latched together adjacent said fuel discharge pipe, said containers being so arranged that upon the opening of said fuel dump valve they will in succession fill with fuel, unlatch and fall free of said aircraft, and means preventing escape of the fuel from each of said containers after it is filled.

9. In an aircraft having a fuel discharge pipe leading from a fuel tank thereof and a fuel dump valve in said pipe, a series of fuel containers located adjacent said fuel discharge pipe, means connecting said containers together in end to end relation, said containers being so arranged that upon the opening of said fuel dump valve they will in succession be filled with fuel from said tank, and means operable by the weight of a filled container to release its connecting means, thus releasing it from the adjacent container of said series, and to close the adjacent ends of said container and said adjacent container.

10. Fuel dumping means for use in an aircraft, comprising a series of collapsible containers, means connecting said containers in end to end relation, said means operable to maintain said connection as long as the adjacent ends of said containers are open and to terminate said connection upon the closing of said adjacent ends, filling means for said containers normally maintaining the adjacent ends of said containers open, and closing means operable to close each of said adjacent ends upon removal of said filling means therefrom.

11. Fuel dumping means for use in an aircraft, comprising a series of normally disconnected containers, closure means at the ends of each of said containers, said closure means when open each being adapted to engage a corresponding means on another of said containers and form a connection therewith, whereby said containers may be assembled to form a single elongated container.

12. Fuel dumping means for use in an aircraft, comprising a series of normally disconnected containers, closure means at the ends of each of said containers, means urging said closure means to closed position, said closure means when open each being adapted to form a connecting engagement with a corresponding means on another of said containers, and means adapted to engage and hold open the closure means of a plurality of said containers whereby said series of containers may be formed into a single elongated container having releasable segments.

13. In an aircraft having a fuel discharge pipe leading from a fuel tank thereof and a fuel dump valve in said pipe, a fuel container normally telescoped over the end of said pipe, a closure member for an end of said container, means urging said member to closed position, said member being held open by the presence of said pipe, means normally restraining said container from removal from said pipe, said restraining means being so constructed and arranged as to be overcome by the weight of said container when filled with fuel.

CALVIN M. BOLSTER.